United States Patent [19]
Blevins

[11] 3,836,848
[45] Sept. 17, 1974

[54] METHOD OF TRANSLATING THE LOCATION OF A PREDETERMINED POSITION ON ONE SIDE OF A SUBSTANTIALLY NONFERROUS STRUCTURAL BARRIER OF A BUILDING TO AN OPPOSITE SIDE OF SAID BARRIER

[76] Inventor: Maurice E. Blevins, 98 Canterbury Rd., Spartanburg, S.C. 29302

[22] Filed: Nov. 1, 1972

[21] Appl. No.: 302,666

Related U.S. Application Data

[62] Division of Ser. No. 1,100, Jan. 7, 1970, Pat. No. 3,704,413.

[52] U.S. Cl............................ 324/67, 324/71 NE
[51] Int. Cl.. G01m 27/00, G01r 19/16, G01r 33/00
[58] Field of Search................ 324/52, 67, 3, 8, 71; 325/310; 340/258

[56] References Cited
UNITED STATES PATENTS

| 1,526,391 | 2/1925 | Stewart | 324/67 |
| 1,750,032 | 3/1930 | Timtiman | 325/310 |
| 2,129,058 | 9/1938 | Hedden | 324/67 X |
| 2,167,490 | 7/1939 | Ryan | 324/67 |
| 2,346,773 | 4/1944 | McBride et al. | 324/6 |
| 2,558,972 | 7/1951 | McLaughlin et al. | 324/8 |
| 2,601,248 | 6/1952 | Brenholdt | 324/67 |
| 2,698,921 | 1/1955 | Wharton | 324/52 |
| 3,066,256 | 11/1962 | Rasor | 324/67 X |
| 3,418,572 | 12/1968 | Humphreys | 324/67 |
| 3,441,842 | 4/1969 | turm | 324/52 |
| 3,551,795 | 12/1970 | Bock et al. | 324/3 |
| 3,597,680 | 8/1971 | Haddon | 324/3 X |
| 3,617,865 | 11/1971 | Hakata | 324/3 |

FOREIGN PATENTS OR APPLICATIONS

| 1,018,739 | 1/1953 | France | 325/31 |
| 647,837 | 12/1950 | Great Britain | 324/67 |

Primary Examiner—Gerard R. Strecker
Attorney, Agent, or Firm—Wellington M. Manning, Jr.

[57] ABSTRACT

A device for locating objects through a substantially nonferrous barrier, the use of which may also be applied for determining the thickness transmitter such a barrier and for localized surveying. An audio oscillator serves as a transmitter which emits signals that are picked up by headphones connected to a resonant tuned circuit. The transmitter is placed on or adjacent an object to be located and is set to transmit. Signals from the transmitter may then be located by the headphones and the peak sound from the signal or a null in the signal may be detected to pinpoint the position of the transmitter on the opposite side of the barrier. Whether or not the peak sound or the null is detected depends upon the attitude of the tranmitter coil with respect to the receiver coil. For measuring thickness of a particular barrier, the transmitter is located as stated above after which a null circle is detected radially out from the point where the tranmiter was located. The distance between the point of location of the transmitter and the null circle is a function of the thickness of the barrier. Alternatively, the null circle diameter may be detected and used to determine barrier thickness.

8 Claims, 9 Drawing Figures

PATENTED SEP 17 1974   3,836,848

METHOD OF TRANSLATING THE LOCATION OF A PREDETERMINED POSITION ON ONE SIDE OF A SUBSTANTIALLY NONFERROUS STRUCTURAL BARRIER OF A BUILDING TO AN OPPOSITE SIDE OF SAID BARRIER

CROSS-REFERENCE TO RELATED APPLICATION

The present application is a division of an application filed on Jan. 7, 1970, entitled A Method Of Translating The Location Of A Predetermined Position On One Side Of A Substantially Nonferrous Structural Barrier Of A Building To An Opposite Side Of Said Barrier, Ser. No. 1,100, now U.S. Pat. No. 3,704,413.

BACKGROUND OF THE INVENTION

Detectors of varying design and construction have enjoyed long use in varied environments. Numerous processes and systems have been equipped with detectors to anticipate the arrival at a certain point in the process or system of the detected object, whether a boxcar, ship, item on a conveyor, or the like. Moreover, detectors have been used to locate buried gas lines, sewers, etc by placing a transmitter in the conduit and propelling the transmitter through the conduit while following its travel on the surface with a device that receives signals from the transmitter. In general, all of the previously used detectors have been employed for indicating general location through a time sequence may be incorporated therewith to initiate some function at an anticipated arrival time of the detected item at some particular point in the process or system.

One generic industry in particular has not benefited from the use of detectors such as are described above. This industry is the construction industry. There are no processes or systems to be controlled, but there are numerous areas where the proper detecting device could be of great assistance. For instance, in both new construction and renovation of old structures the contractor needs to know where a particular item located on one side of a wall or barrier would be positioned on the opposite side of the barrier. It may be desirable to locate the item so as to produce an opening in the barrier that will pass into the item or abut the item. It may also be desirable to locate the item so as to produce an opening in the barrier that will not come into contact with the item. Such a detector would be invaluable to a contractor to assist him in properly locating a position for a doorway; to a television service man for antenna lead passageways; to predict the origin of leaks in a roof; and the like. In the past, techniques have been available for such situations as mentioned above. In general these techniques involved measuring a particular distance or distances on the barrier side where the item is located and then attempting to reproduce the measurements on the opposite side of the barrier or using a magnetic instrument that is influenced for instance by nails in a stud, joist or the like. Both of these techniques possess obvious limitations and disadvantages.

Particularly in the renovation of old structures unknowns come into play that could influence the cost of the renovation, approach to the renovation or the time required to complete the project. The contractor does not know, for example, the thickness of walls, the location of certain structural or decorative elements of the building, and the like. Having knowledge of these unknowns, the contractor can more accurately estimate the cost of the renovation and can more efficiently complete the job once the work has begun. A device that will supply the answer to these unknowns is certainly needed.

A further area of need is that of local surveying. It guite often is necessary to know whether the top of one wall is the same height as the top of an opposite, but spacially separate wall; or where the start or termination of a door, window, or the like would correspond on a wall at ninety degrees to the wall in which the door, window, etc. is located. Additionally, there are numerous other areas in local surveying where answers such as the above would be both helpful and a time saver. Therefore a device is needed to be used as a local survey instrument, especially where the surveying is blind, that is, where the reference point cannot be seen.

As may be seen from the above discussion, there are several areas in the construction industry where a suitable detector would be guite beneficial to the contractor. The goals of such devices are different from those previously used. In the process and system environment, only a generalized detection is required. In the aforementioned construction situations a precision detection is required for an error of inches could mean the difference between success or failure of the particular placement of an opening, the renovation of an old wall whose thickness was unknown or a solution for a particular blind surveying problem. The detector of the present invention and the methods taught herein provide a detector that is small, inexpensive, portable, and quite accurate. Furthermore, the detector of the present invention is quite satisfactorily useable for all of the aforedescribed situations in the construction industry as well as numerous others.

Numerous detector systems are set forth in the prior art. There is, however, no teaching or combination that would suggest the detector, or methods of the present invention. Exemplary of the prior art in this area are Agnew, U.S. Pat. No. 2,814,032; Bell, U.S. Pat. No. 2,820,959; Horsfall, U.S. Pat. No. 3,017,622; Richard, U.S. Pat. No. 3,134,254; Uemure, U.S. Pat. No. 3,201,774; Borley, U.S. Pat. No. 3,219,925; Engdohl, U.S. Pat. No. 3,350,660 and Christroinsen, U.S. Pat. No. 3,355,631.

SUMMARY OF THE INVENTION

It is an object of the present invention to provide novel apparatus for the transmission and detection of signals through a substantially nonferrous barrier.

It is a further object of the present invention to provide novel transmitting and receiving apparatus which may be used to predict an unobstructed path of travel through a barrier.

Still another object of the present invention is to provide a novel method for accurately locating on one side of a barrier a transmitter that is positioned on the opposite side of the barrier.

Another object of the present invention is to provide a novel method for detecting on one side of a barrier the position of an object that is present on the opposite side of the barrier.

Still further, another object of the present invention is to provide a novel method for accurately measuring the thickness of a substantially nonferrous wall or barrier.

Generally speaking, the apparatus of the present invention comprises a transmitter and a receiver tuned thereto, said transmitter comprising an audio oscillator operating in a frequency range of from about 400 cycles per second to about 1 kilocycle per second, a power source for said oscillator and a housing to contain said oscillator and said power source, said receiver comprising a resonant circuit operating at approximately the same frequency as the oscillator, a housing for the receiver, and display means for indicating the signal picked up by the receiver.

Additionally the housing that contains the receiver may be equipped with marking means, and measuring means as assists in recording the position of the transmitter and also in determining the thickness of the barrier that separates the transmitter and the receiver.

A method of the present invention for precisely detecting generally includes the steps of positioning transmitter means at a desired location; turning on said transmitter means; and detecting the signal transmitted from said transmitter means by receiver means so as to locate with accuracy, the position of said transmitter means, said transmitter means and said receiver means being separated by a substantially nonferrous containing barrier.

The detecting method of the present invention may be defined more specifically with reference to the relative position of the receiver means with respect to the transmitter means. When the axis of the transmitter coil core is parallel to the axis of the receiver coil core, a peak in the signal picked up by the receiver will indicate the location of the transmitter. Conversely, when the axis through the transmitter coil core is perpendicular to the axis through the receiver coil, a null in the signal picked up will locate the position of the transmitter.

In finding the peak or maximum signal, two techniques may be employed. First one may move the receiver in a circular pattern seeking to first receive the signal being transmitted and thereafter pinpointing the peak signal by refining the circular movement. A second method for locating the position of the transmitter by detecting a peak in the signal involves movement of the receiver along ordinates. The receiver is moved along a vertical ordinate until the peak signal is noted. At that point, a horizontal line is drawn through the receiver. The receiver is then moved along a horizontal ordinate until a peak signal is noted, whereupon a vertical line is drawn through the receiver. The two lines are then projected to their point of intersection which will pinpoint the location of the transmitter.

Location of the transmitter by the null method involves a different technique. As mentioned above, for null detection, the axis through the transmitter coil core is perpendicular to the axis through the receiver coil core. With the axes perpendicular, the receiver is moved along a line until a null is noted in the signal picked up. A line is then drawn through the receiver and along the plane of the coil. The receiver is then rotated to another plane and moved along this plane until a null is noted in the signal received. A second line is drawn, through the current plane of the receiver. Projection of the two lines to the point of intersection follows, and the point of intersection pinpoints the location of the transmitter.

Both of the above location techniques involve a unidirectional receiver coil which necessitates the use of multiple readings for truly accurate location at the intersection of lines produced for the various readings. A multidirectional coil may, however, be employed, which will detect the null or peak signals only when both ordinates of location are satisfied. In other words, instead of having to move the receiver along $x$ and $y$ ordinates, both ordinates are incorporated into the coil and the peak signal or null in the signal will be detected only at the intersection of the vertical and horizontal ordinates.

Once the transmitting means has been properly located on the opposite side of the barrier separating the receiving and transmitter means, if desired, the thickness of the barrier may now be ascertained. Starting from the point of location of the transmitting means, the receiving means is moved outwardly from the said point until a null circle is noted around the location point. This null circle is patterned from the geometry of the magnetic field being created by the transmitting means and is located with the respective coil core axes parallel. The distance from the location point of the transmitter means to the null circle is a direct function of the thickness of the barrier. Through appropriate trigonometric analysis, it has been determined that the thickness of the barrier may be predicted by multiplying the radium of the null circle by .707. It is not, however, necessary to first precisely locate the position of the transmitter for determination of barrier thickness. Instead, the transmitter may be generally located and the diameter of the null circle of the magnetic field determined. As with the radius, the diameter of the null circle is a function of wall thikness.

The method for measuring the thickness of a barrier would therefore comprise the steps of specifically locating the position of the transmitter means and thereafter determining the radius of a null circle found in the magentic field created by the transmitting means or generally locating the transmitting means and determining the diameter of the null circle, and then using the determined radius or diameter to calculate wall thickness.

More specifically with respect to the apparatus and wall thickness determination method of the present invention, a calibrated tape may be affixed to the receiver means, whereby, after determining the point of location of the transmitting means, the tape may be affixed at the point of location and thereafter played out until the null circle is reached. The tape having been calibrated to compensate for the constant .707, will read directly the thickness of the barrier being measured. Likewise, if the null circle diameter is measured for determination of wall thickness, the opposite side of the tape may be calibrated to directly read wall thickness from the diameter measurement.

A further use of the apparatus of the present invention is that of local surveying. Local surveying can be any use where it is desirable to locate the relative position at one point corresponding to a like position at another point. For instance the apparatus of the present invention may be used to level an item with respect to a reference where the reference is separated from the item to be positioned by a wall, a corner, and the like. Further, it may be desirable to suspend or otherwise position some item at the same level as a reference where the item to be positioned has no adjacent reference point. Numerous additional situations are envisioned where it may be desirable to use the apparatus of the present invention for local surveying or positioning. Local surveying is readily accomplished by placing the transmitter at the point of reference, making sure that the axis through the coil core, is level, and then, using one of the aforedescribed procedures, precisely locating the position of the transmitter adjacent the desired area where the item is to be positioned, leveled or the like.

DESCRIPTION OF THE PREFERRED EMBODIMENTS

Figure 1:
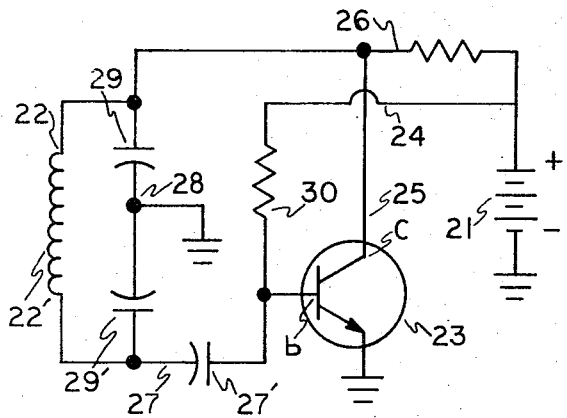
FIG. 1 is a circuit diagram that may be used for transmitting apparatus of the present invention.
Figure 2:
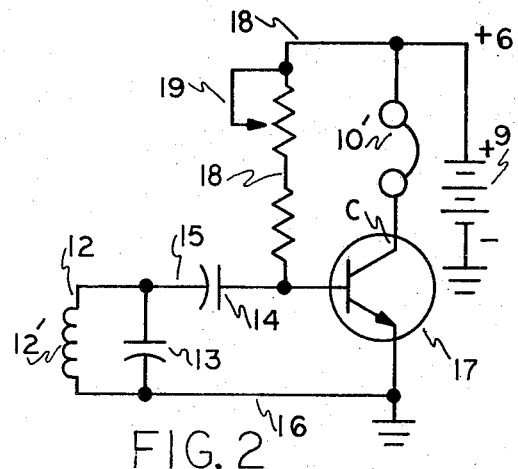
FIG. 2 is a circuit diagram of components that may be suitably employed in the receiving means of the present invention.

The preferred embodiments of the present invention will now be described with reference to the FIGURES. FIGS. 1 and 2 show preferred circuitry for the appartus of the present invention. In FIG. 1, the circuitry for a transmitter means is shown. A source of D.C. power 21 provides the power necessary for transmitting signals to be detected by a receiving means. Source 21 is connected to an npn transistor 23 through conductors 24, 25 and 26 with conductor 25 being connected to the collector C of transistor 23 and conductor 24 leading through bias resistor 30 to the base B of transistor 23. A core 22 is defined by coil windings 22' and is connected on one end to source 21 through conductor 26 and on the other end to transistor 23 through conductor 27. Core 22 further has connected across itself two condensers 29 and 29' that are located along conductor 28, said condensers having ground potential therebetween. A further condenser 27' is located along conductor 27 between core 22 and transistor 23. In this regard, while a transistorized colpitts audio oscillator as illustrated in FIG. 1 is preferred for the transmitter means of the present invention, any audio oscillator may be suitably employed so long as it operates in a range of from about 400 cycles per second to about 1 kilocycle per second. D.C. power source 21 is preferably a dry cell battery.

Figure 3:
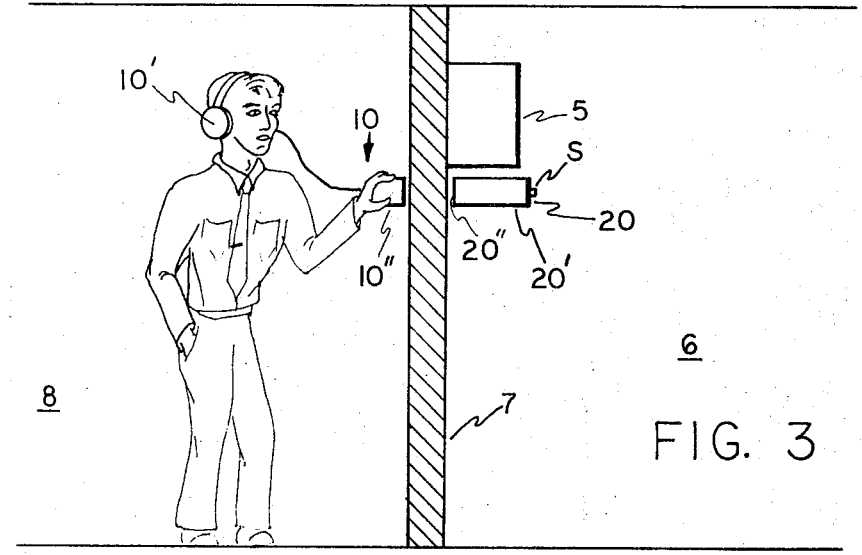
FIG. 3 is a section of a barrier illustrating generally the use of the apparatus of the present invention.
Figure 4:
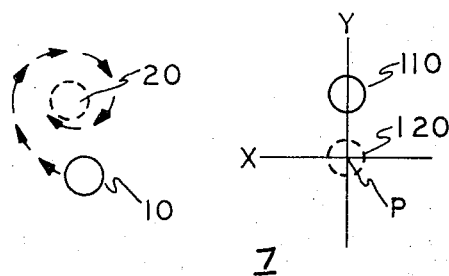
FIGS. 4 and 4A are front view of a barrier showing the relationship of the apparatus of the present invention and illustrating graphically preferred techniques for locating the transmitter means.
Figures 5, 6:
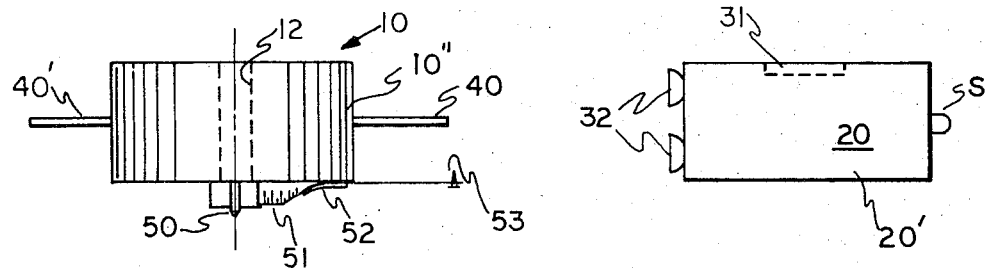
FIG. 5 is a side view of the receiving means of the present invention illustrating hardware that may be affixed thereto in accordance with the teachings of the present invention.
FIG. 6 is a side view of the transmitting means of the present invention.

The transmitter means circuitry as shown in FIG. 1 may be suitably contained in a housing 20' as shown in FIGS. 3, 4 and 6. Housing 20' may be produced from any suitable material without effecting the operation of the transmitter means though if metal is used it should be a very thin gage. Preferably, housing 20', as shown in FIGS. 3, 4 and 6 is circular in cross section and has a flat contact surface 20'' that abuts the barrier or an item to be detected. Further, in the construction of transmitter means 20, core 22 should be positioned such that an axis extending therethrough is perpendicular to flat contact surface 20''. Having surface 20'' as closely perpendicular as practical to the axis through core 22, improves the accuracy of the apparatus and methods of the present invention. Housing 20' thus contains the D.C. power source 21 and the audio oscillator, and may be provided with a switch means S that is used to regulate power from source 21 to the remainder of the transmitter means circuitry. It should be pointed out, however, that power drain on source 21 is very small and a 6 volt dry cell battery has a continuous use life span in the transmitter means of several months. Accordingly, switch means S may be eliminated from transmitter means 20 whereby the transmitter means 20 operates continuously. In fact, it is economically feasible to produce a disposable or rechargeable transmitter means where the housing 20' completely and permanently encloses the power source and circuitry. In this regard, housing 20' may be molded around source 21 and the circuitry. With the disposable or rechargeable transmitter means, switch means S may also be included if desired. Housing 20 may also be equipped with a leveling indicator means 31 and barrier engaging means 32 as shown in FIG. 6. Hence with the axis of the transmitter coil core perpendicular to the end 20'', leveling indicator means 31 may be successfully employed when the apparatus of the present invention is utilized for local surveying to show that the transmitter is level. Likewise when it is desirable to mount transmitter means 20 to the side of the barrier, etc, barrier engaging means 32 may be employed. While barrier engaging means 32 are illustrated as suction cups, any suitable arrangement may be employed that will hold transmitter means 20 in the desired location.

Circuitry for the receiving means 10 may be seen in FIG. 2 and generally comprises a tuned resonant circuit having optionally associated therewith an amplifier having a variable gain control capability. This circuitry may be connected to headphones 10' as shown in FIG. 2 or may provide input to a meter which may be used for visual observation of peaks and nulls for the location of the transmitter means 20. The resonant circuit of FIG. 2 comprises a core 12 that is defined by coil windings 12', and condenser 13. The resonant circuit is connected to a transistor 17 by conductors 15 and 16. Transistor 17 is used to amplify the signals received by the resonant circuit in certain circumstances as will be defined hereinafter. Headphones 10' are connected into the circuit between the collector C of transistor 17 and amplifier power source 9. Conductor 18 is connected to amplifier power source 9, and has positioned along its length a potentiometer 19 which serves as a variable gain control for the receiver by control of D.C. emitter current. The amplifying transistor 17 as shown in FIG. 2 is not required in all circumstances. Accordingly, though not shown, a switching circuit may be incorporated into the receiver means circuit to bypass amplifying transistor 17. In practical application signals received by receiving means 10 are of sufficient strength that the amplifier is not needed. When using the peak signal method, the amplifier may be required for separation of the transmitter and the receiver of more than 3 feet. For the null method the distance is 1 foot.

Whereas it was previously stated that housing 20' of transmitter means 20 may be manufactured from any suitable material, a housing 10'' for receiving means 10 may be constructed of any suitable non-metallic material, and preferably is manufactured of a plastic material such as styrene. A suitable arrangement for the construction of housing 10'' of receiving means 10 is illustrated in FIG. 5. FIG. 5 shows receiving means 10 having a housing 10'' and illustrating the core 12 in phantom, the axis of which would extend vertically therethrough. Practically speaking the windings 12' that define core 12 make up the majority of receiving means 10 and the remaining circuitry may be ideally located within core 12, and the receiving means 10 may be completely enclosed by a unitarially constructed housing 10''. In this regard, as was discussed with respect to transmitter means 20, housing 10'' may be molded around the components of receiving means 10. Extending outwardly from opposite sides of housing 10'' are straight edge members 40 and 40'. Straight edge members 40 and 40' extend along the plane of receiver coil 10 and are useful in recording the ordinate locations of transmitter means 20 once the peak or null in the signal has been detected by receiving means 10. Additionally, a rod member 50 is shown depending from the bottom side of receiving means 10. Rod 50 provides rotational support for a calibrated tape 51 that may be used to directly read wall thickness by a method that will be described hereinafter. As illustrated, tape 51 is wound around rod 50 in spring loaded fashion so as to provide automatic rewind after use. Tape 51 is removed from rod 50 against the bias of the spring member, not shown, and passes through guide slot 52 which holds tape 51 against receiving means 10 and also transposes tape 51 from a vertical disposition to a horizontal disposition so as to facilitate its use in the determination of wall thickness. Tape 51 may also be provided at its forward end with a restraining member 53. Restraining member 53 may be provided as shown in FIG. 5 with a sharp point for engagement with a wall or similar surface and is of a size such as to prevent the withdrawal of tape 51 from within guide 52. Rod 50 may very suitably serve a dual purpose. For instance, rod 50 may in addition to providing support for tape 51, be a marking member so that, in using the circular technique of locating the transmitter member, rod 50, as a marking member when depressed against the wall or barrier, will produce a mark on said wall or barrier so as to record the position of transmitter means 20.

Figure 7:
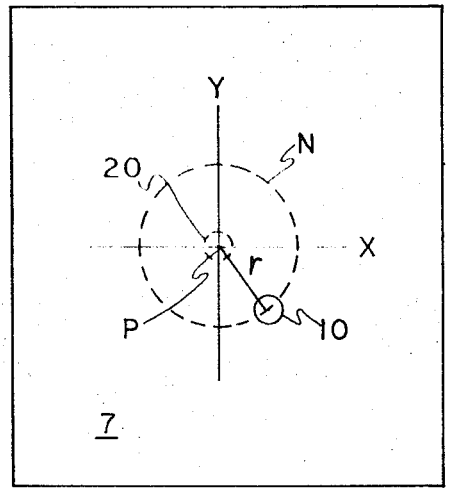
FIG. 7 is a front view of a barrier showing generally the location of a transmitter means and the determination of the thickness of the barrier.

The methods of the present invention may best be described with reference to FIGS. 3, 4 and 7. In FIG. 3 for instance, a cross section is shown of a portion of two rooms having a wall between. A cabinet or similar structure 5 is shown depending from wall 7 in room 6. It will be assumed in the illustration that it is desirable for the operator that is shown holding a receiving means 10 in room 8 and wearing earphones 10', to produce an opening through wall 7 that will enter room 6 at a point just beneath cabinet 5. Transmitter means 20 are therefore located adjacent wall 7 and beneath cabinet 5 in room 6. Transmitter means 20 thus emits signals that are detected by the operator via receiving means 10 and headphones 10'. Once the transmitter means 20 has been detected and the position noted on the surface of wall 7 in room 8, the operator may then confidently produce his opening through wall 7 without striking cabinet 5, or producing an opening that is too far below cabinet 5.

In the sense of the present invention, the term non-ferrous barrier is used. Preferably, when using the apparatus of the present invention to detect or measure thickness of the barrier, the barrier will contain no ferrous materials, other than perhaps, fastening members. Certain amounts of ferrous materials will not, however, impair the effectiveness of the apparatus. In this regard, the apparatus of the present invention may be utilized with barriers containing up to approximately 1/4 inch of thickness of ferrous materials.

Referring to FIG. 4, the techniques for precisely locating the transmitter means 20 will be discussed. Relating wall 7 of FIG. 4 to the environment shown in FIG. 3, a transmitter means 20 is shown in phantom which would place the transmitter in room 6. Additionally, receiving means 10 are positioned such that the axis of the coil core of transmitter 20 is parallel to the axis of the coil core of receiving means 10. The operator, thus seeking to pinpoint the exact location of transmitter means 20 may use the circular approach as shown by the arrows. Once the signal is detected, the operator moves the receiver in a spiral path, seeking to detect the peak signal being transmitted. Once the peak signal is detected, the location of the receiver is noted and it is known that the transmitter is positioned at that spot on the opposite side of wall 7. Also, when the respective coil core axes are parallel, the ordinate approach may be employed to precisely locate the position of transmitter means 20. This technique is also illustrated in FIG. 4. Using the ordinates technique, the receiver means 110 is moved along a horizontal axis until a peak in the signal being transmitted detected. Once the peak signal is detected, a vertical line $y$ is drawn through the receiver 110. Receiver 110 is then moved along a vertical axis until the peak signal is noted and then a horizontal line $x$ is drawn through receiver 110. Both lines are then projected to their point of intersection P which will be the position of transmitter 120. Both of the lines produced according to the ordinate technique may be drawn by using members 40 as shown on receiver 10 in FIG. 5.

Figure 4A:
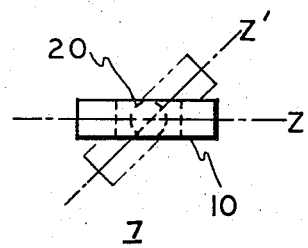

FIG. 4A shows the techniques employed when the axis through the coil core of the receiving means 10 is perpendicular to the axis through the coil core of transmitter means 20. Transmitter 20 is shown in phantom, and in the context of FIG. 3, would be located in room 6, adjacent wall 7. The axis of the transmitter means coil core is through wall 7. Receiver 10 is positioned such that the axis through its coil core is parallel to wall 7 and hence perpendicular to the axis of the coil core of transmitter means 20. Once the transmitter 20 is generally located, the receiver 10 is adjusted to detect the null in the transmitted signal. A line is then drawn through the plane of the receiver as indicated by Z in FIG. 4A. The receiver 10 is then rotated to another angular attitude and the new null is detected. Such an angular rotation is a new position is shown in phantom in FIG. 4A. When the null is detected at the new position, a line is drawn through the plane Z' of the receiver. The two lines are then projected to their point of intersection to locate the position of transmitter 20.

While either of the techniques discussed above may be employed to locate transmitter means 20, the null method is probably the most accurate due to the sharper distinction of a null in the signal than the peak signal. When, however, a meter or other visual display device is employed, instead of earphones, then the various techniques should exhibit the same degree of accuracy.

The above location or detection techniques were based on the use of a coil constructed to pick up the signals in one direction only. There are, however, multidirectional coils that may be advantageously used with the apparatus of the present invention. These coils are sometimes referred to as deflection yokes, baseball wound coils, double axis coils, etc. In any event, however, the use of these coils allows the location of the transmitter means with a single notation of a peak or null in the signal. Deviation in any direction will destroy the peak or null in the signal. Such coils are very practical for speed, but generally are not quite as accurate as the one direction coils. Quite successful utilization of the double axis coil has been experienced, however, in the context of the apparatus and methods of the present invention.

In addition to a method for locating a transmitter means so as to enable the operator to determine a proper location for producing an opening in a wall or barrier or for whatever purpose, the apparatus of the present invention may likewise be utilized to determine the unknown thickness of a wall or barrier 7. Referring to FIG. 7 for instance a transmitter means 20 is shown in phantom on the opposite side of a wall 7. To determine the thickness of wall 7 according to the teachings of the present invention, the operator first locates transmitter means 20 by using a receiving means 10 as was described with respect to FIGS. 3, 4 and 6. Specifically the transmitter means 20 can be located by the circular or ordinate peak technique, the null technique, or by use of the double axis coil. Once the transmitter means 20 has been located and the point of location recorded, as by marker 50 of receiver 10, the receiving means 10 is moved outwardly to detect a null circle in the magnetic field produced by transmitter means 20. The null circle is detected while the axes of the coil cores are parallel. The distance between the point of location of transmitter means 20 and the null circle N is indicated as r in FIG. 7. Distance r is, in effect, the radius of the null circle. This radius in inches when multiplied by a constant .707 will indicate the thickness of wall 7. Using the apparatus of the present invention, however, as set forth in FIG. 5, once the position of transmitter means 20 has been pinpointed, tape 51 could be secured by member 53 at the point of location of transmitter means 20. Then as receiving means 10 moves outwardly in search of the null circle, tape 51 will move off of rod 50 through guide 52 and once the null circle has been detected, the operator may read directly from tape 51 to determine the thickness of wall 7.

Wall or barrier thickness may also be determined as mentioned earlier without a precise location of transmitter means 20. Instead, the transmitter means 20 is generally located by a detection of a signal. Then, moving outwardly from the general location of transmitter 20, the null circle N is located and recorded. Receiver 10 is then moved back toward transmitter 20, using the increase in the signal to pass very closely over transmitter 20, and beyond to locate the opposite side of the null circle N. Having thus located both sides of the null circle N, the diameter of the circle is known and may be used to determine the thickness of wall 7. Tape 51 as shown in FIG. 5 could again be employed and one side of tape 51 could be calibrated to read wall thickness directly from the null circle diameter measurement. In this regard, tape 51 would be secured by member 53 at one location of the null circle and then played out as receiver 10 is moved to the opposite arc of null circle N. Wall thickness could then be read directly from tape 51.

Figure 8:
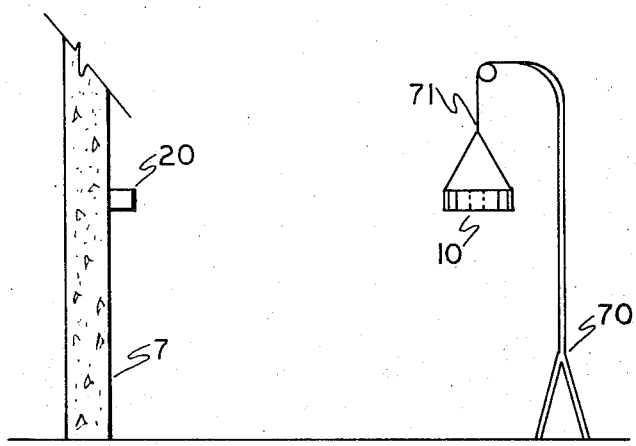
FIG. 8 is a side view of a barrier supporting a transmitting means and illustrating a local surveying aspect of the present invention.

FIG. 8 represents still another use of the apparatus of the present invention and that is local surveying. While FIG. 8 illustrates an oversimplified use of the apparatus of the present invention for local surveying, the explanation with regard to FIG. 8 should most certainly teach those skilled in the art the method of local surveying according to the teachings of the present invention. A wall 7 as shown in FIG. 8 having a transmitter means 20 mounted thereon and level. It is assumed in this particular illustration that it is desirable to locate in the area of receiving means 10 some object that would be level with the point on wall 7 at which transmitter means 20 is located. In other words the apparatus of the present invention is being used as a leveling device. With transmitter means 20 emitting the normal signals therefrom, the receiving means 10 may be moved in a vertical plane at the desired point of location across the path of transmitter means 20. As shown in FIG. 8, the axis through the respective coil cores are perpendicular to each other and the receiving means 10, at the appropriate location will detect a null in the signal being transmitted. Accordingly, once the null is detected, a point even with transmitter means 20 has been located and can be used as desired by the operator. In the particular environment of FIG. 8, receiving means 10 is shown suspended from a support member 70 by a suspension member 71. In this environment receiving member 10 can be raised or lowered to achieve the exact position or transmitter means 20 whereby said position can be noted for further reference. A further feature of interest with respect to FIG. 8 is that of the absence of a barrier 7 between the transmitter means 20 and receiving means 10. The presence of a barrier 7 would as previously described not interfere with the successful operation of the apparatus of the present invention.

While the preferred methods of the present invention have been described, the apparatus of the present invention may be employed with still other variations of the described methods. Specifically, an analysis of the geometry of the magnetic field produced by the transmitter means may be used to mathematically predict other or the same results attained by the teachings set forth herein. Accordingly, the scope of the present invention should be governed only by the claims appended hereto.

What is claimed is:

1. Apparatus for locating a desired object through a substantially nonferrous barrier comprising:
   a. transmitting means, said transmitting means comprising an audio oscillator operating in a frequency range of from about 400 cycles per second to about 1 kilocycle per second, a power source for said audio oscillator and a housing to contain said oscillator and said power source;

b. receiving means for detecting signals transmitted by said transmitter means, said receiving means comprising a resonant circuit operating at the same frequency as said transmitting means, non-metallic housing to contain said resonant circuit and display means for indicating the signal picked up by said receiving means; and c. means provided on said receiving means housing to mark on said barrier a point in question, said point on said barrier having been selected on one side of said barrier and translated to an opposite side of said barrier by locating said transmitting means with said receiving means;

and wherein the receiving means housing has a straight edge member secured thereto and extending outwardly therefrom, said straight edge member being useable as a guide for producing an ordinate on said barrier, at the location of the receiver upon detection of a predetermined signal, said ordinate being useable to better locate the said desired object.

2. Apparatus for local surveying comprising the apparatus as defined in claim 1 wherein the transmitter means housing has means received thereon to removably secure said transmitter means to said barrier.

3. Apparatus as defined in claim 1 wherein the transmitter means housing has level indicator means received therein.

4. Apparatus for locating a desired object through a substantially nonferrous barrier as defined in claim 1 wherein the resonant circuit contains a unidirectional coil.

5. Apparatus for locating a desired object through a substantially nonferrous barrier as defined in claim 1 wherein the resonant circuit contains a multidirectional coil.

6. Apparatus for determining the thickness of a substantially nonferrous barrier comprising:

a. transmitting means, said transmitting means comprising an audio oscillator operating in a frequency range of from about 400 cycles per second to about 1 kilocycle per second, a power source for said audio oscillator and a housing to contain said oscillator and said power source;

b. receiving means for detecting signals transmitted by said transmitter means, said receiving means comprising a resonant circuit operating at the same frequency as said transmitting means, a non-metallic housing to contain said resonant circuit and display means for indicating the signal picked up by said receiving means; and c. means provided on said receiving means housing to mark on said barrier a point in question, said point on said barrier having been selected on one side of said barrier and translated to an opposite side of said barrier by locating said transmitting means with said receiving means; and wherein the receiving means further comprises a retractable tape measure mounted thereon, said tape measure being useable to measure a null circle detected by said receiving means, whereby said null circle measurement may be used to determine the thickness of said barrier.

7. Apparatus for determining the thickness of a substantially nonferrous barrier as defined in claim 6 wherein the tape measure is calibrated to read directly in barrier thickness.

8. Apparatus for determining the thickness of a substantially nonferrous barrier as defined in claim 6 wherein said marking means is secured to said receiving means housing and extends outwardly therefrom, and wherein said tape measure is received under spring tension around said marking means.

* * * * *